July 1, 1930.  A. E. HENRY  1,769,343
AUTO SEAT
Filed March 16, 1929  2 Sheets-Sheet 1
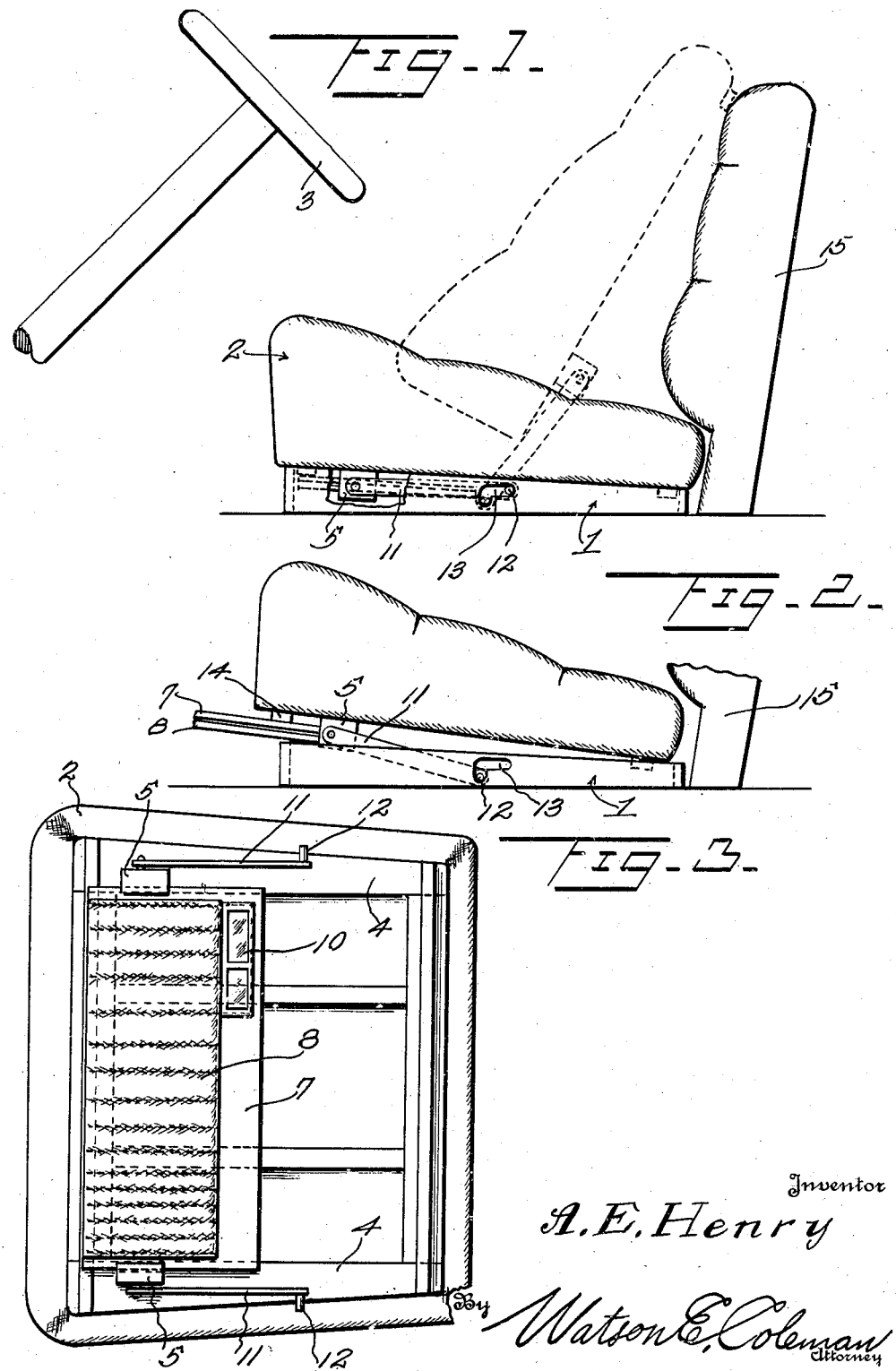

July 1, 1930.　　　A. E. HENRY　　　1,769,343
AUTO SEAT
Filed March 16, 1929　　2 Sheets-Sheet 2
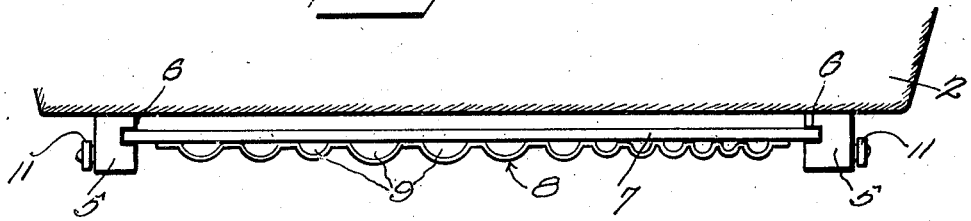
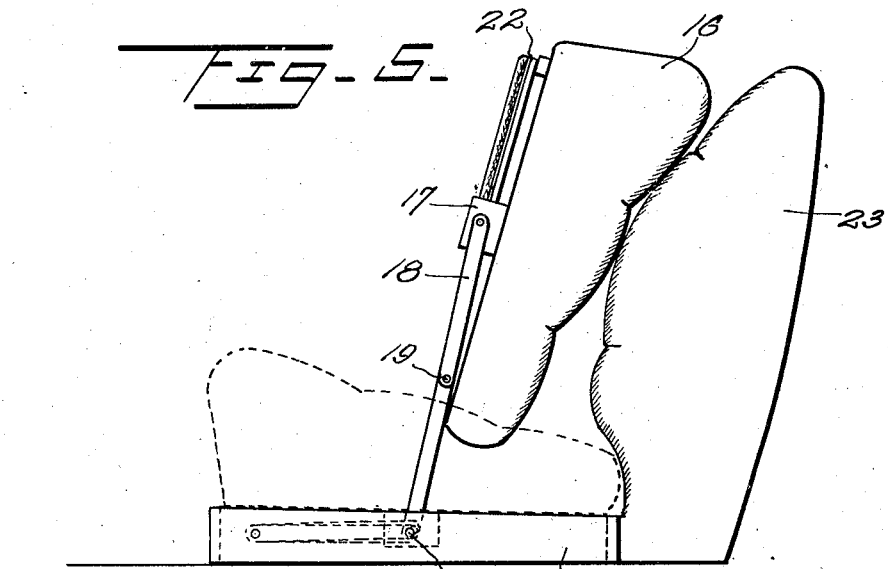
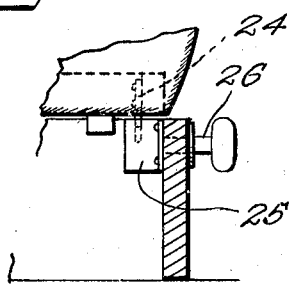 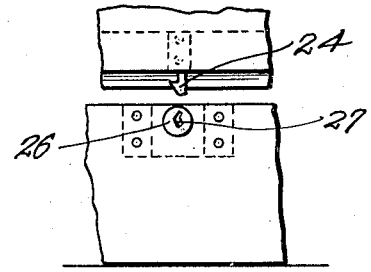
Inventor
A. E. Henry
By Watson E. Coleman
Attorney Patented July 1, 1930

1,769,343

UNITED STATES PATENT OFFICE

ABNER E. HENRY, OF GREENSBURG, PENNSYLVANIA

AUTO SEAT

Application filed March 16, 1929. Serial No. 347,619.

This invention relates to motor vehicles and pertains particularly to an improved means for storing tools in the vehicle in a manner which will permit the occupant of the vehicle to have ready access thereto when any one of the tools is desired for use.

The invention broadly contemplates the mounting of a tool kit holder upon the under side of a vehicle seat and the mounting of the seat in such a manner that it may be readily raised from the usual supporting frame to facilitate the withdrawal of any desired one of a number of tools making up the kit Another object of the invention is to provide a vehicle seat carried tool kit embodying means whereby the seat may be raised in such a manner as to expose the under face thereof and to present all of the tools of the kit to view.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawings:—

Figure 1 is a view in side elevation of a motor vehicle seat and back therefor, representing the front seat of a motor vehicle and showing a portion of the structure embodying this invention in side elevation and attached thereto;

Figure 2 is a side elevational view of the seat structure shown in Figure 1, showing the seat in raised forwardly drawn position with the tool kit carried thereby drawn outwardly;

Figure 3 is a bottom plan view of the seat structure and the kit carried thereby;

Figure 4 is a view looking toward the lower portion of the front edge of the seat showing the tool carrying structure in edge elevation;

Figure 5 is a side elevational view of a rear automobile seat showing the same swinging upwardly against the back thereof;

Figure 6 is a transverse sectional view through the forward portion of one of the seats showing a locking mechanism therefor;

Figure 7 is a front elevational view of the locking mechanism and associated portions of the seat and supporting base.

Referring more particularly to the drawings wherein like numerals of reference indicate corresponding parts throughout the several views, the numeral 1 indicates generally the usual supporting or base frame of a motor vehicle seat, the seat structure, being indicated as a whole by the numeral 2 and in the present instance representing the front seat of a motor vehicle, the steering wheel adjacent thereto being indicated by the numeral 3.

The seat structure 2 is provided with the usual body frame 4 and secured to the under faces of the side members of this frame adjacent the front of the seat are blocks 5, the inner or opposed faces of which are provided with the grooves 6 which extend substantially parallel with the adjacent seat body frame 4. Positioned between the blocks 5 is a kit board 7, the outer edges thereof being slidably engaged in the grooves of the blocks and the under face of this board has secured thereto a case 8, which is formed to provide a plurality of pockets 9, each of which is designed to receive a tool in the usual manner. The under face of this board may also be provided with a suitable frame 10 for holding the motor vehicle owner's drivers permit and registration card.

The outer face of each of the kit board supporting blocks 5 has pivotally attached thereto one end of a link 11, the other end of each link carrying a laterally directed pin 12 which has sliding pivotal engagement in a bayonet slot 13 formed in the adjacent side member of the seat supporting frame 1.

As shown, the short angle of each slot is at the forward end therefor and directed downwardly, the slots extending lengthwise of the members in which they are formed.

With the link connection 11 of the type shown between the fixed blocks 5 carried by the seat 2 and the base 1 the front edge of the seat may be lifted up so that the positioning bars 14 thereof will be free of the base frame whereupon the seat may be drawn forwardly and the tool kit board slid forwardly from under the seat until it is in a position where any one of the tools may be readily removed. The seat can then be lowered so as to let the rear portion of the board 7 rest upon the top edge of the front member of the base 1 with the seat member 14 resting upon the board in which position the tool kit may be held to permit ready removal or insertion of any of the tools carried thereby.

Due to the position of the steering wheel 3 it will be readily seen that the front edge of the seat cannot be swung upwardly to position against the back 15 but, if it is necessary to get beneath the seat for any purpose, the same may be drawn forwardly to the position just described, after which the rear edge can be swung up, the pin 12 of the links 11 meanwhile pivoting in the downwardly directed ends of the bayonet slots 13 until the rear of the seat is brought to rest against the top of the back thereof, as shown in dotted lines in Figure 1.

In Figure 5 there is shown a seat structure similar to the structure shown in Figure 1, which represents the rear seat of the motor vehicle. In this figure the seat 16 is shown as having secured to the under face thereof at each side, blocks 17 to each of which is pivotally attached one end of a link member 18 hinged as indicated at 19 intermediate the ends, the other end of this link being pivotally secured as indicated at 20 to the inner face of the adjacent side member of the seat supporting base 21. The inner faces of the blocks 17 are slotted as in the case of the blocks 5, to receive the tool kit carrying board 22, or, if desired, the board may be fixed to these blocks. In this structure the seat is permitted to have its front edge swung upwardly and rearwardly so as to come to rest against the back 23 with the under face thereof directed outwardly. With a tool kit mounted upon the board 22 the same will be presented to view when the seat is swung upwardly in the manner shown, so that ready access may be had thereto.

In order to secure the seats in down position each may have attached thereto and depending from the under face thereof latch members 24 which when the seat is down engages in a suitable lock 25, normally operable by a knob 26 projecting from the outer face of the front member of the seat supporting frame.

This knob may be of the type wherein a key opening 27 is formed therethrough for the insertion of a key into the lock to secure the seat in down position.

From the foregoing description it will be readily apparent that in accordance with the present invention a kit of tools may be carried in an orderly manner, readily accessible for use and when not in use secure against theft.

Having thus described my invention, what I claim is:—

1. The combination with a motor vehicle seat having a supporting base of a pair of link units, each pivotally connected at one end to the under-face of the seat and at the opposite ends to the supporting base, said links being hingedly secured together at their other ends, an article supporting body slidably carried by the seat, and locking means for holding the seat on the base.

2. The combination with a motor vehicle seat having a supporting base of a pair of link units pivotally connected at one end to the under-face of the seat and at their opposite ends to the supporting base, said links being hingedly secured together at their other ends, and locking means for holding the seat on the base, said locking means comprising a latching member mounted on said seat and a lock secured to said base and adapted to engage said latching means for holding the seat in locked position on the base.

In testimony whereof I hereunto affix my signature.

ABNER E. HENRY.